United States Patent
Li et al.

(10) Patent No.: US 12,370,615 B2
(45) Date of Patent: Jul. 29, 2025

(54) TECHNIQUES FOR APPLYING BRAZING MATERIAL TO FORM A SHROUDED IMPELLER

(71) Applicant: Danfoss A/S, Nordborg (DK)

(72) Inventors: Tianlei Li, Tallahassee, FL (US); Lin Xiang Sun, Tallahassee, FL (US)

(73) Assignee: Danfoss A/S, Nordborg (DK)

( * ) Notice: Subject to any disclaimer, the term of this patent is extended or adjusted under 35 U.S.C. 154(b) by 0 days.

(21) Appl. No.: 18/274,061

(22) PCT Filed: Feb. 23, 2022

(86) PCT No.: PCT/US2022/017412
§ 371 (c)(1),
(2) Date: Jul. 25, 2023

(87) PCT Pub. No.: WO2022/187038
PCT Pub. Date: Sep. 9, 2022

(65) Prior Publication Data
US 2024/0424587 A1  Dec. 26, 2024

Related U.S. Application Data

(60) Provisional application No. 63/157,071, filed on Mar. 5, 2021.

(51) Int. Cl.
*B23K 1/00* (2006.01)
*F01D 5/04* (2006.01)
*B23K 101/00* (2006.01)

(52) U.S. Cl.
CPC ............. *B23K 1/0018* (2013.01); *F01D 5/04* (2013.01); *B23K 2101/001* (2018.08); *F05D 2230/237* (2013.01)

(58) Field of Classification Search
CPC ............ B23K 1/0018; B23K 2101/001; B23K 37/04–0452; B23K 37/06; F01D 5/04;
(Continued)

(56) References Cited

U.S. PATENT DOCUMENTS 5,109,604 A * 5/1992 Koebele ................. F16H 41/28
29/889.21
8,899,931 B2 * 12/2014 Nakaniwa ............. F04D 29/624
416/185
(Continued)

FOREIGN PATENT DOCUMENTS

CA 2715596 C * 9/2017 ............. F01D 9/044
CN 101275580 A * 10/2008 ........... B23K 26/206
(Continued)

OTHER PUBLICATIONS

International Search Report and Written Opinion for application No. PCT/US2022/017412 mailed Jul. 1, 2022.

*Primary Examiner* — Kiley S Stoner
(74) *Attorney, Agent, or Firm* — Carlson, Gaskey & Olds, P.C.

(57) ABSTRACT

In some aspects, the techniques described herein relate to a method of manufacturing a shrouded impeller, including: arranging a shell relative to an impeller, wherein the impeller includes a plurality of blades, wherein the shell includes a plurality of slots, and wherein the arranging step includes aligning each of the slots with a tip of a respective one of the blades of the impeller; applying brazing paste to each of the tips by using the slots to direct the brazing paste to the tips; arranging a shroud relative to the impeller; and joining the impeller and shroud using a brazing technique.

14 Claims, 9 Drawing Sheets

(58) Field of Classification Search
CPC . F05D 2230/237; F04D 29/023; F04D 29/284
USPC ....... 228/49.1, 49.4, 174, 165–169, 245–255
See application file for complete search history.

(56) References Cited

U.S. PATENT DOCUMENTS

| | | | |
|---|---|---|---|
| 2006/0280609 A1* | 12/2006 | Ranz | F04D 29/284 416/182 |
| 2007/0147999 A1* | 6/2007 | Feher | F04D 29/284 416/186 R |
| 2008/0142319 A1* | 6/2008 | Manter | B23K 1/0018 188/218 XL |
| 2009/0110556 A1* | 4/2009 | Jahnz | F04D 29/284 29/889 |
| 2010/0037458 A1* | 2/2010 | Ranz | F01D 1/06 29/889 |
| 2010/0189568 A1* | 7/2010 | Watanabe | B23K 1/0018 29/889 |
| 2010/0316498 A1 | 12/2010 | Cahill et al. | |
| 2011/0150656 A1* | 6/2011 | Olsen | F01D 5/323 416/213 R |
| 2011/0318183 A1* | 12/2011 | Noronha | F04D 29/281 416/189 |
| 2012/0117803 A1* | 5/2012 | Niihara | B23K 1/0018 29/889 |
| 2013/0078099 A1* | 3/2013 | Ahn | B23K 1/0008 416/182 |
| 2014/0169971 A1* | 6/2014 | Vedula | F04D 29/023 416/185 |
| 2014/0328676 A1 | 11/2014 | Robson et al. | |
| 2015/0044048 A1* | 2/2015 | Ahn | B22F 5/10 29/889.7 |
| 2020/0256441 A1* | 8/2020 | Keller | F01D 5/323 |
| 2021/0048037 A1* | 2/2021 | Siefring | F04D 29/2222 |
| 2021/0254482 A1* | 8/2021 | Park | F01D 5/02 |
| 2024/0424587 A1* | 12/2024 | Li | F01D 5/04 |
| 2024/0426318 A1* | 12/2024 | Zhang | F04D 29/441 |

FOREIGN PATENT DOCUMENTS

| | | | | | |
|---|---|---|---|---|---|
| CN | 101946067 | A | * | 1/2011 | ............ F04D 17/06 |
| CN | 102959248 | A | * | 3/2013 | ............ B23K 31/02 |
| CN | 104343726 | A | * | 2/2015 | ............ B22F 3/1055 |
| CN | 102625881 | B | * | 4/2015 | ........... B23K 1/0018 |
| EP | 1493901 | A1 | * | 1/2005 | ............ F01D 9/042 |
| EP | 2623720 | A2 | * | 8/2013 | ............ F01D 11/008 |
| EP | 2789860 | A2 | * | 10/2014 | ............ F01D 5/225 |
| JP | 2013024057 | A | * | 2/2013 | ............ F04D 29/023 |
| JP | 2020094503 | A | * | 6/2020 | ........... B23K 1/0008 |
| KR | 20130116677 | A | * | 10/2013 | |
| KR | 20170124029 | A | * | 11/2017 | |
| KR | 20190121587 | A | * | 10/2019 | |
| WO | WO-2012063375 | A1 | * | 5/2012 | ........... B23K 1/0018 |
| WO | WO-2013031038 | A1 | * | 3/2013 | ............ F04D 29/023 |
| WO | WO-2014098417 | A1 | * | 6/2014 | ............ F04D 29/023 |
| WO | WO-2021182883 | A1 | * | 9/2021 | ............ F04D 29/023 |
| WO | WO-2021225024 | A1 | * | 11/2021 | ............ F04D 29/023 |
| WO | WO-2022187038 | A1 | * | 9/2022 | ........... B23K 1/0018 |

* cited by examiner

TECHNIQUES FOR APPLYING BRAZING MATERIAL TO FORM A SHROUDED IMPELLER

BACKGROUND

Refrigerant compressors are used to circulate refrigerant in a chiller via a refrigerant loop. Refrigerant loops are known to include a condenser, an expansion device, and an evaporator. The compressor compresses the fluid, which then travels to a condenser, which in turn cools and condenses the fluid. The refrigerant then goes to an expansion device, which decreases the pressure of the fluid, and to the evaporator, where the fluid is vaporized, completing a refrigeration cycle.

Many refrigerant compressors are centrifugal compressors and have an electric motor that drives at least one impeller to compress refrigerant. Fluid flows into the impeller in an axial direction, and is expelled radially from the impeller. The fluid is then directed downstream for use in the chiller system. Some known refrigerant compressors include shrouded impellers which include a circumferentially-extending shroud, or wall, connecting the tips of the impeller blades while permitting refrigerant to flow in and out of the impeller.

SUMMARY

In some aspects, the techniques described herein relate to a method of manufacturing a shrouded impeller, including: arranging a shell relative to an impeller, wherein the impeller includes a plurality of blades, wherein the shell includes a plurality of slots, and wherein the arranging step includes aligning each of the slots with a tip of a respective one of the blades of the impeller; applying brazing paste to each of the tips by using the slots to direct the brazing paste to the tips; arranging a shroud relative to the impeller; and joining the impeller and shroud using a brazing technique.

In some aspects, the techniques described herein relate to a method, wherein the shell includes a main section configured to fit radially around the tips of the blades, and wherein the shell further includes a cap covering leading edges of the blades.

In some aspects, the techniques described herein relate to a method, wherein the shell exhibits a single-wall thickness and the slots extend completely through the shell.

In some aspects, the techniques described herein relate to a method, wherein, when viewed from a radially outer location, a perimeter of each of the slots surrounds a perimeter of a corresponding one of the tips.

In some aspects, the techniques described herein relate to a method, wherein the step of arranging the shell includes arranged the shell radially outward of the tips.

In some aspects, the techniques described herein relate to a method, wherein the step of arranging the shell includes arranging the shell such that the tips project at least partially into a corresponding one of the slots.

In some aspects, the techniques described herein relate to a method, wherein, between the steps of applying brazing paste and arranging the shroud, the method includes removing the shell from the impeller.

In some aspects, the techniques described herein relate to a method, wherein the shell is reusable.

In some aspects, the techniques described herein relate to a method, wherein the shell is naturally removed during the brazing technique.

In some aspects, the techniques described herein relate to a method, wherein the slots extend from an area adjacent trailing edges of the blades to an intermediate point along the blades.

In some aspects, the techniques described herein relate to a method, wherein the slots are open facing toward a leading edge of the blades.

In some aspects, the techniques described herein relate to a method, wherein the shell includes a portion with a thickness greater than a single-wall thickness.

In some aspects, the techniques described herein relate to a method, wherein the shroud includes a portion projecting beyond trailing edges of blades of the impeller.

In some aspects, the techniques described herein relate to a method of manufacturing a shrouded impeller, including: arranging a shroud relative to an impeller, wherein the shroud includes a portion projecting beyond trailing edges of blades of the impeller; applying brazing material adjacent the portion; flowing the brazing material along tips of the blades of the impeller during a brazing technique in which the impeller is joined to the shroud; and removing the portion.

In some aspects, the techniques described herein relate to a method, wherein the brazing material is either a paste or a preform.

In some aspects, the techniques described herein relate to a method, wherein the portion includes a channel and a flange.

BRIEF DESCRIPTION OF THE DRAWINGS

In FIG. 23, a preform of brazing material, in the shape of a ring, is situated about the impeller.

DETAILED DESCRIPTION

Figure 1:
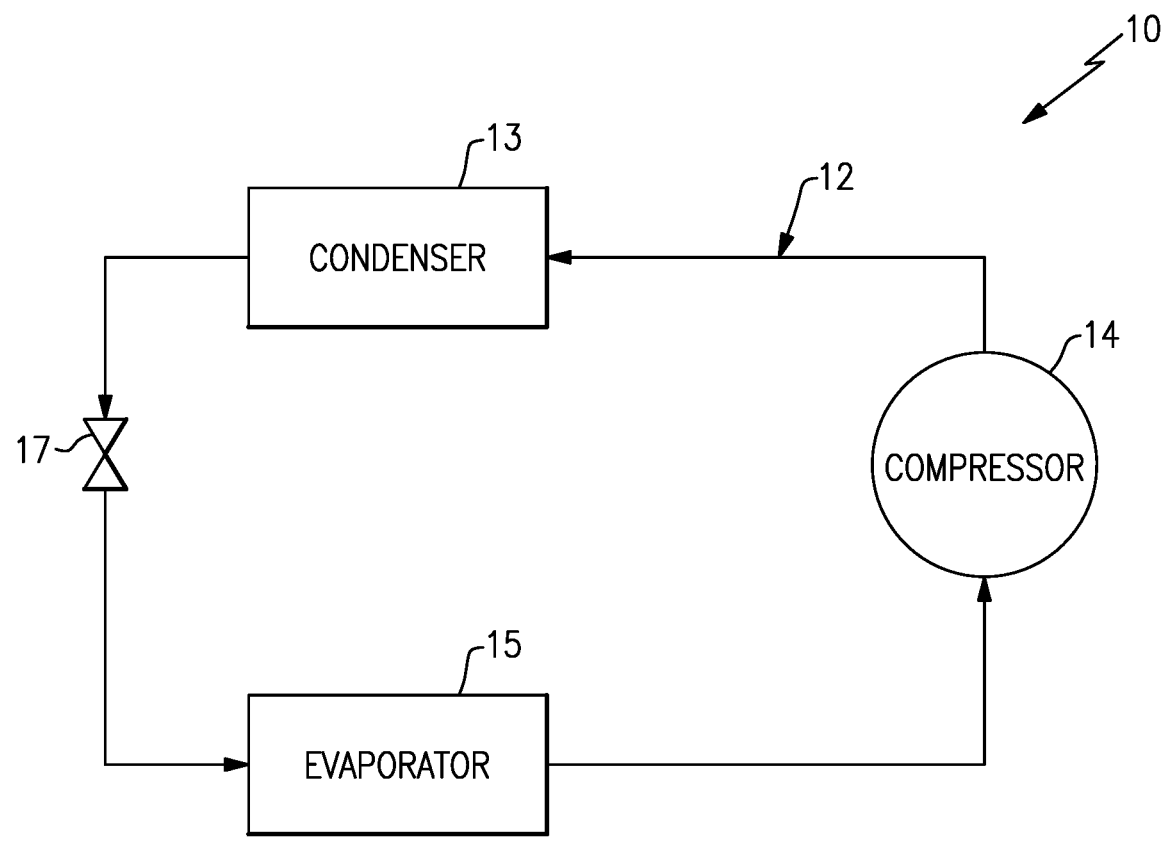
FIG. 1 schematically illustrates a refrigerant system.

FIG. 1 illustrates a refrigerant system 10. The refrigerant system 10 includes a main refrigerant loop, or circuit, 12 in communication with a compressor 14, a condenser 13, an evaporator 15, and an expansion device 17. This refrigerant system 10 may be used in a chiller, for example. In that example, a cooling tower may be in fluid communication with the condenser 13. While a particular example of the refrigerant system 10 is shown, this application extends to other refrigerant system configurations, including configurations that do not include a chiller. For instance, the main refrigerant loop 12 can include an economizer downstream of the condenser 13 and upstream of the expansion device 17.

Figure 2:
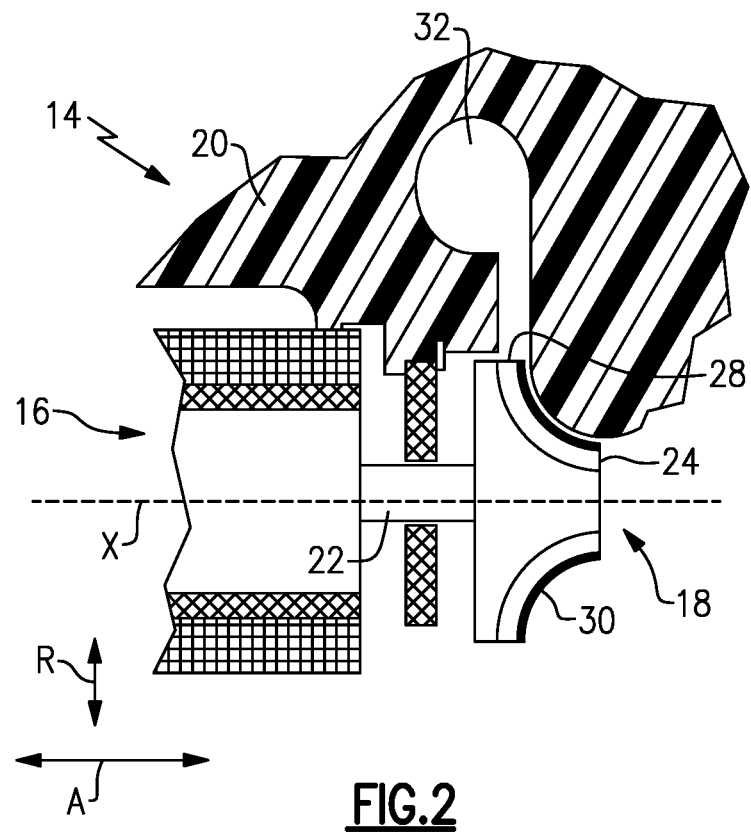
FIG. 2 schematically illustrates an example refrigerant compressor.

FIG. 2 schematically illustrates an example refrigerant compressor 14 according to this disclosure. The refrigerant compressor 14 includes a housing 20 within which an electric motor 16 is arranged. The housing 20 is schematically depicted and may comprise one or more pieces. The electric motor 16 rotationally drives an impeller 18 via a rotor shaft 22 about a central axis X to compress refrigerant. The rotor shaft 22 may comprise one or more pieces. The illustrated refrigerant compressor 14 is a centrifugal compressor, meaning, among other things, that the impeller 18 is configured to expel fluid in a direction away from the axis of rotation (e.g., the axis X of the shaft 22). In particular, the impeller 18 has an outlet 28 radially outward of an inlet 24, with the outlet 28 axially spaced downstream of the inlet 24. The compressed refrigerant then exits the compressor 14 via an outlet volute 32. While reference herein is made to a refrigerant compressor 14, this disclosure is not limited to any one particular working fluid, and extends to systems configured for other fluids such as air, water, etc.

In this example, the impeller 18 is a shrouded impeller. That is, a circumferentially-extending shroud 30, or wall, partially encases the impeller 18 and, in particular, connects tips of blades of the impeller, thereby adding rigidity to the blades. In this disclosure, the term "impeller" is used to refer to a central hub and the impeller blades projecting from that hub, and does not refer to a shroud. However, in this art field, an assembly including a hub, blades, and shroud is sometimes collectively referred to as an "impeller" as shorthand for a "shrouded impeller." In this disclosure, an assembly including a hub, blades, and shroud will be referred to as a shrouded impeller, an impeller assembly, or simply an assembly.

The shroud 30 is permanently attached to the impeller 18 by brazing, in this example. As the impeller 18 and shroud 30 rotate together with the shaft 22, the impeller 18 and shroud 30 need to stay connected under varying forces, such as centrifugal force and thermal expansion differences between the impeller 18 and shroud 30.

Figure 3:
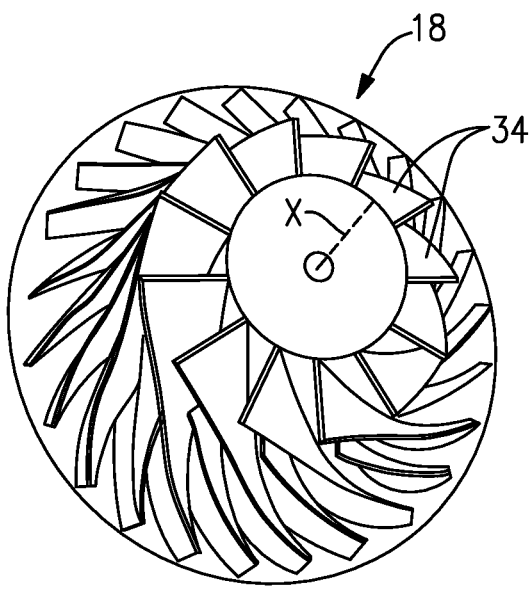
FIG. 3 illustrates an example impeller.

FIG. 3 illustrates an example impeller 18. The impeller 18 has a plurality of blades 34 arranged circumferentially about the central axis X. The blades 34 direct the refrigerant radially outward between the inlet 24 and the outlet 28 as the refrigerant is compressed.

Figure 4:
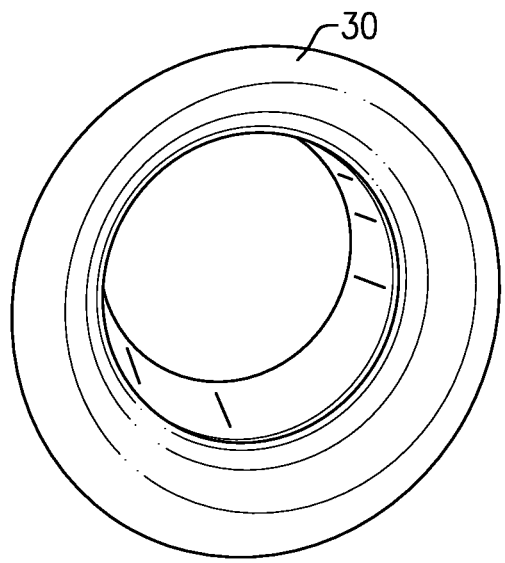
FIG. 4 illustrates an example shroud.

FIG. 4 illustrates an example shroud 30. The shroud 30 fits over the impeller 18 and contacts tips of the blades 34. The shroud 30 and the impeller 18 may be metallic components, for example. The shroud 30 and the impeller 18 may be the same material, or may be different materials.

Figure 5:
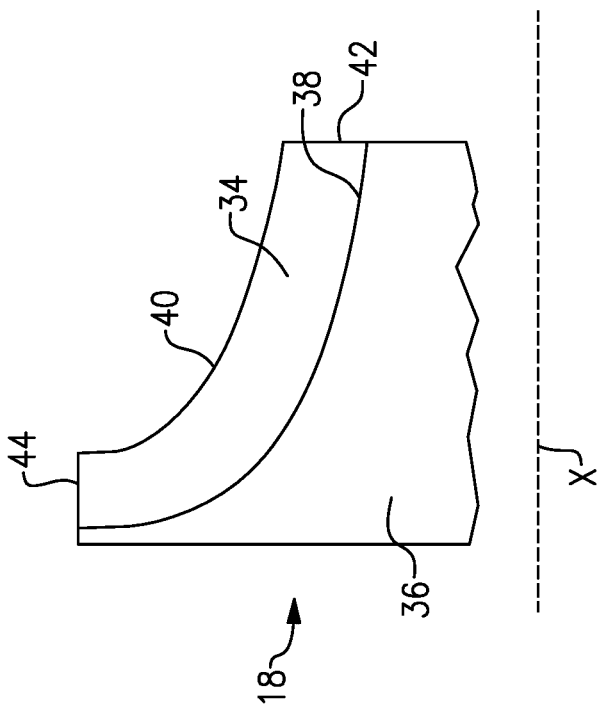
FIG. 5 is a partial cross-sectional view of an example impeller.

With reference to FIG. 5, each of the blades 34 projects radially from a hub 36 which is disposed about the central axis X. Specifically, each of the blades 34 extends radially from a root 38 adjacent a radial outer surface of the hub 36 to a tip 40 opposite the root 38. Further, the blades 34 extend from a leading edge 42 adjacent an inlet of the impeller 18 to a trailing edge 44 at an opposite axial end of the blades 34 and adjacent an outlet of the impeller 18.

Figure 6:
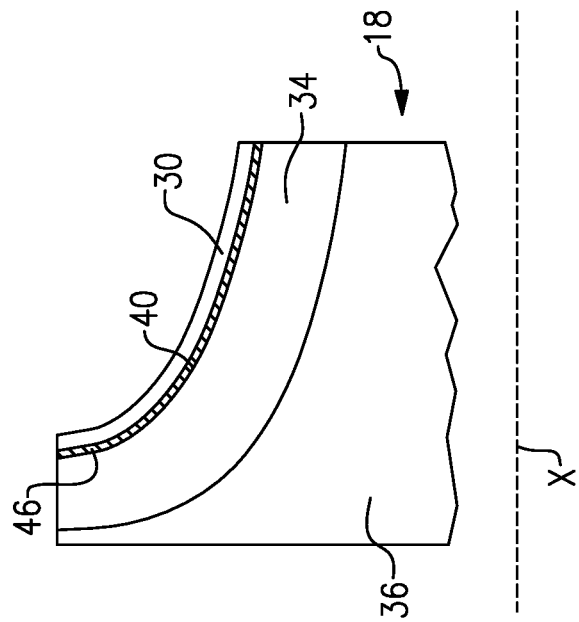
FIG. 6 is a partial cross-sectional view of the impeller of FIG. 5 with a shroud attached to the impeller.

FIG. 6 is representative of the manner in which a shroud 30 is joined to the tips 40 of the blades 34 via a brazing material 46. Compressors may achieve higher efficiency by having zero clearance between the shroud and the impeller. As such, it is known to join a shroud and an impeller using brazing. In known brazing techniques, brazing material is manually applied to the tips of the blades of the impeller. However, it can be difficult to control the surface finish near the brazed area due to overflow of the brazing material. This disclosure includes a number of techniques for directing brazing material to the appropriate, desired location on the blades 34, which has a number of benefits, including increasing brazing joint strength and avoiding overflow of melted brazing material to the blades 34, while also increasing the ease of manufacture and increasing consistency. Ultimately, this disclosure provides for a better, and more reliable, connection between the shroud 30 and the blades 34, which provides for better function of the shrouded impeller.

A first aspect of this disclosure involves using a slotted shell to direct brazing material onto the tips of the blades and, optionally, the side surfaces of the blades immediately adjacent the tips.

Figure 7:
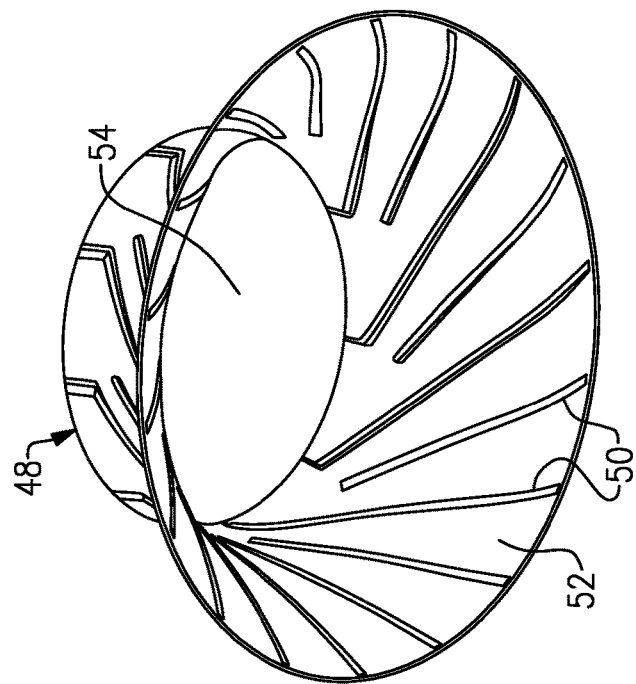
FIG. 7 is a bottom perspective view of an example shell.

FIG. 7 illustrates an example shell 48. The shell 48 includes a plurality of slots 50 configured to direct brazing paste onto the tips 40 of the blades 34. The shell 48 exhibits a single-wall thickness and includes a main section 52 configured to fit radially around the tips 40 of the blades 34. An end of the shell 48 adjacent the leading edges 42 may include a solid cap 54 connected to the main section 52. The cap 54, when present, covers the leading edges 42 of the blades 34 and, in turn, the inlet to the impeller 18.

Figure 10:
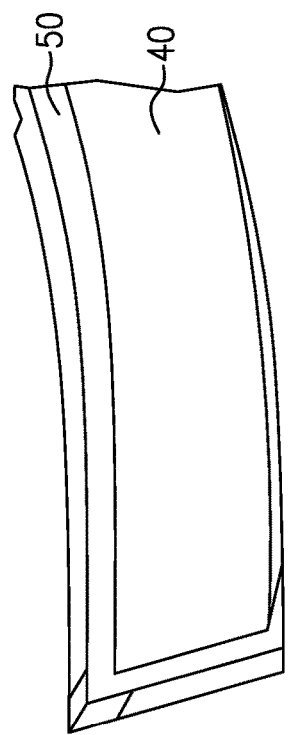
FIG. 10 is another partial close-up view of the arrangement of the blade relative to the shell.
Figure 8:
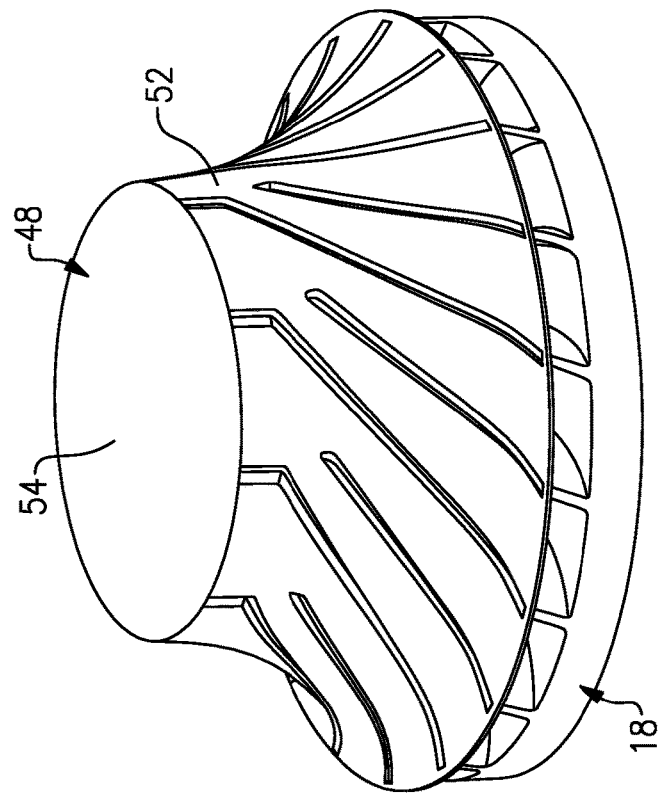
FIG. 8 is a perspective view of the shell of FIG. 7 arranged relative to an impeller.
Figure 9:
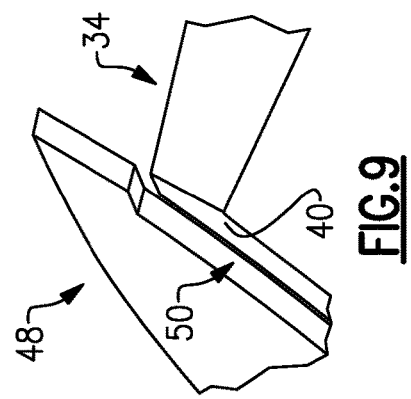
FIG. 9 is a partial close-up view of an arrangement of a blade relative to the shell.

With reference to FIGS. 8-10, which illustrate the shell 48 relative to the impeller 18, the shell 48 is arranged such that the slots 50 are aligned with the blades 34. Further, the slots 50 extend completely through the single-wall thickness of the shell 48 such that brazing paste can flow from a radially outer location, through the shell 48, and to the tips 40 via the slots 50.

When viewed from a radially outer location, as in FIG. 10, a perimeter of each of the slots 50 surrounds a perimeter of a respective one of the tips 40. The slots 50 can be widened relative to the dimensions of the tips 40 depending on whether it is desired for an amount of brazing paste to flow over the tips 40 and onto sides of a main section of the blades 34. Alternatively, the slots 50 can be narrowed to avoid such overflow.

Figure 11:
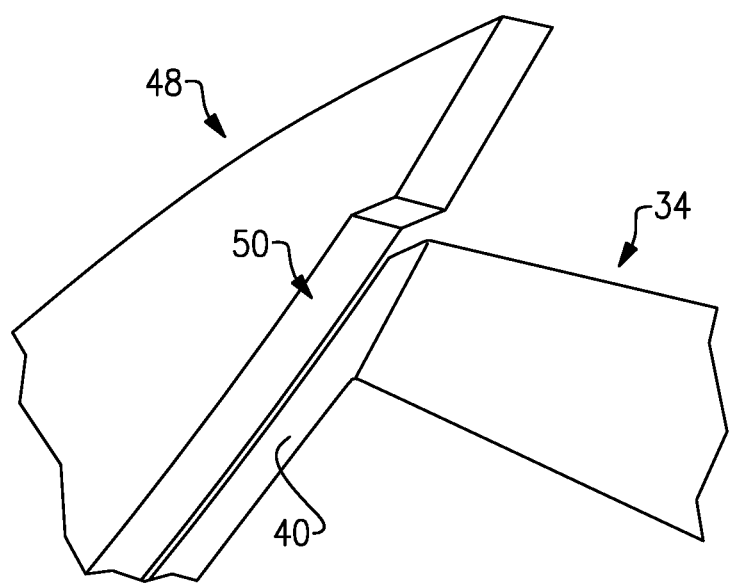
FIG. 11 is a partial close-up view similar to FIG. 9, but illustrates an arrangement in which a tip of the blade projects partially into a slot of the shell.
Figure 12:
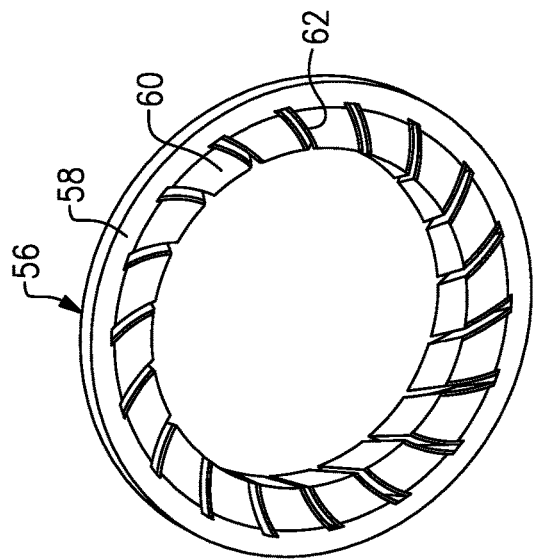
FIG. 12 is a bottom view of another example shell.

When viewed in cross-section, the shell 48 in FIG. 9 is arranged such that the shell 48 is radially outward of the tips 40 of the blade 34. This arrangement encourages brazing paste to flow over the tips 40 and onto sides of a main section of the blades 34. In this way, the tips 40 and the sides of the blades 34 are wetted by brazing paste, which is desirable in some circumstances. FIG. 11 is representative of an arrangement of the shell 48 in which the tips 40 of the blades 34 project partially into the slots 50, which prevents brazing paste from overflowing onto the sides of the blades 34, which is beneficial in other circumstances.

In an example technique, a user applies brazing paste, which includes a combination of flux and filler metal powder, to the shell 48 at locations adjacent the slots 50. When doing so, the brazing paste is directed to the tips 40 via the slots 50. With the brazing paste applied to the tips 40, the shell 48 can be manually removed and a shroud 30 can be placed over the tips 40. The impeller 18 and shroud 30 are then joined using a brazing process. In this regard, the shell 48 may be made of a metallic material, and may be reusable. Alternatively, instead of manually removing the shell 48, the shell 48 may be made of a material such as wax which is naturally removed during a brazing process.

In the examples of FIGS. 7-11, the shell 48 covered the entirety of the blades 34, specifically from their leading edges 42 to their trailing edges 44. FIGS. 12-15 illustrate another example shell 56 which includes an outer circumferential portion 58 and a main portion 60 extending inward from the outer circumferential portion. The main portion 60 includes slots 62 similar to the slots 50, with the exception that the main portion 60, and the slots 62, extend from an area adjacent the trailing edge 44 of the blades 34 to an intermediate point 64 along the blades 34. The intermediate point 64 is between the leading edge 42 and the trailing edge 44. The intermediate point 64, in this example, is closer to the trailing edges 44 than the leading edges 42.

Figure 15:
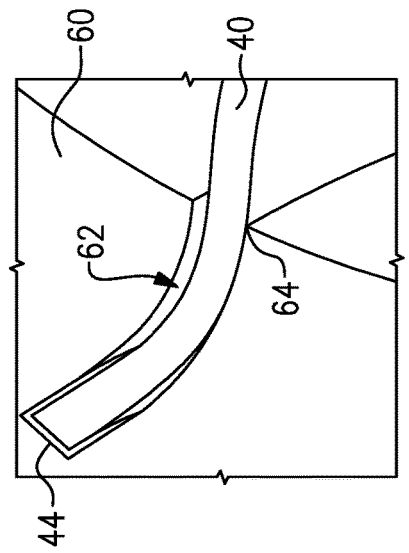
FIG. 15 is a partial close-up view of the shell of FIG. 12 arranged relative to a blade.
Figure 13:
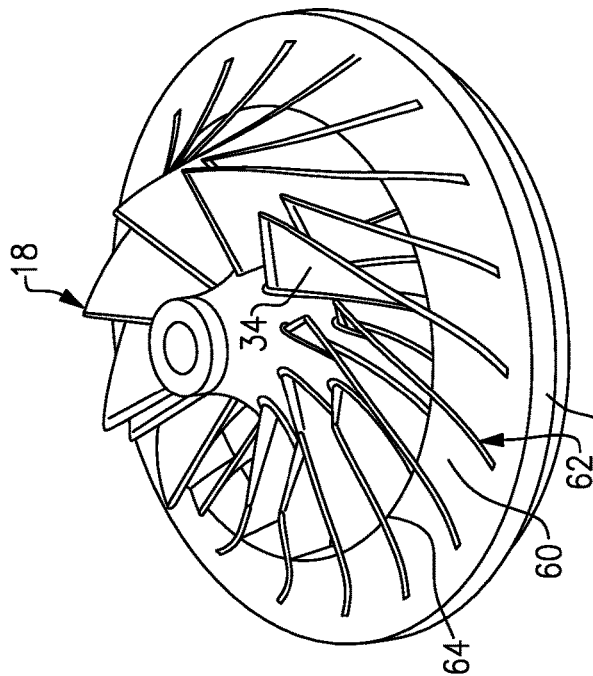
FIG. 13 is a top perspective view of the shell of FIG. 12 arranged relative to an impeller.
Figure 14:
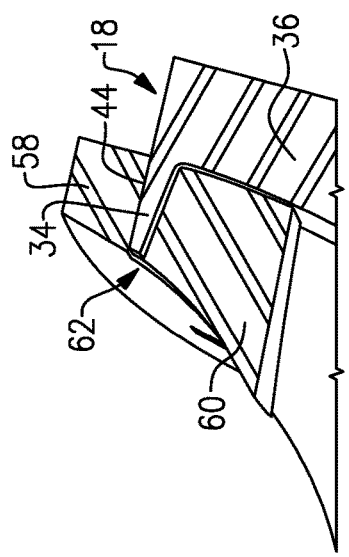
FIG. 14 is a partial cross-sectional view of the shell of FIG. 12 arranged relative to an impeller.
Figure 16:
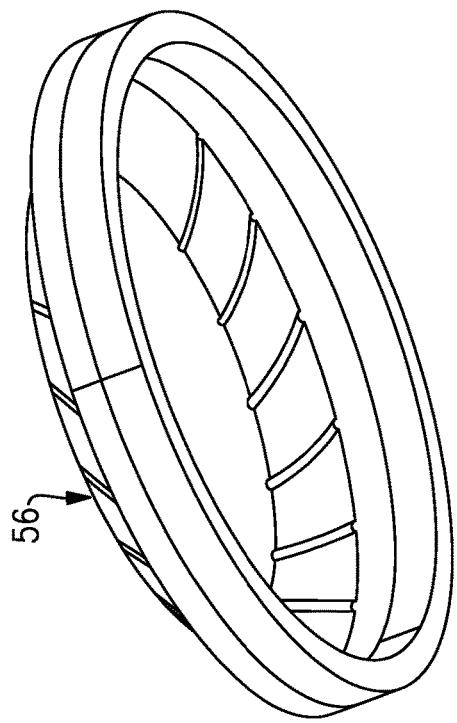
FIG. 16 is a bottom perspective view of another example shell.
Figure 20:
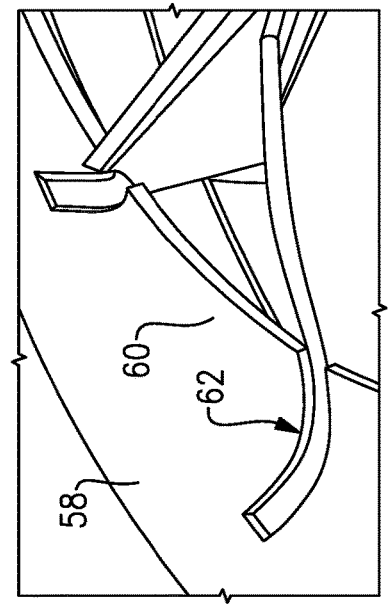
FIG. 20 is a partial close-up view of the shell of FIG. 16 arranged relative to a blade.
Figure 17:
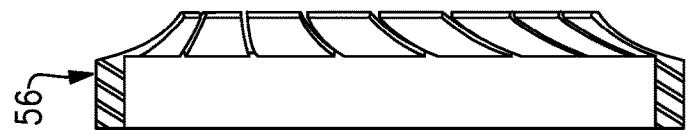
FIG. 17 is a cross-sectional view of the shell of FIG. 16.
Figure 18:
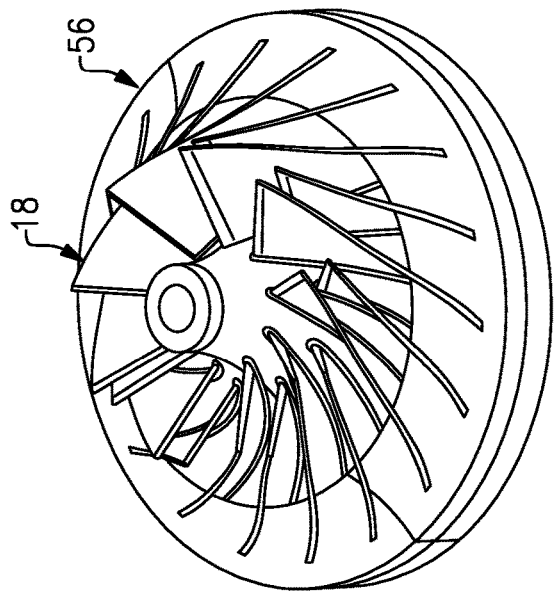
FIG. 18 is a top perspective view of the shell of FIG. 16 arranged relative to an impeller.
Figure 19:
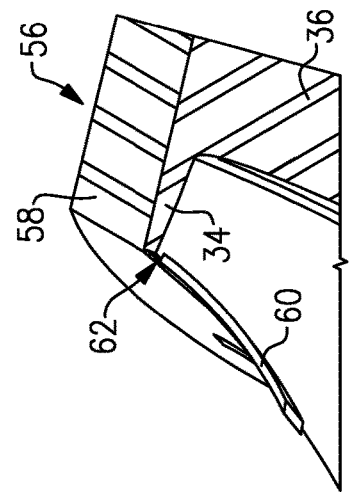
FIG. 19 is a partial cross-sectional view of the shell of FIG. 16 arranged relative to an impeller.

With reference to FIGS. 14 and 15, the outer circumferential portion 58 covers the entirety of the trailing edges 44 of the blades 34. Further, the main portion 60 exhibits a radial dimension greater than the single-walled thickness shell 48 and, in particular, the main portion 60 extends from a point radially outside the tips 40 to the hub 36. In this way, the shell 56 is configured to prevent overflow of brazing paste onto the sides of the blades 34.

In an example technique, a user applies brazing paste to shell 56 adjacent the slots 62. Since the slots 62 only extend along a portion of the tips 40, the brazing paste is only applied along a portion of the tips 40. While the brazing paste is applied unevenly along the tips 40, forces present during the manufacturing process cause the brazing paste to run along the entirety of the tips 40, specifically as the brazing paste is heated. Such forces include gravity and/or capillary forces. Accordingly, the example of FIGS. 12-15 may save time as brazing paste does not need to be applied along the entirety of the tips 40.

In order to permit the flow of brazing paste along the tips 40 in a direction toward the leading edges 42, the slots 62 are open facing the leading edges 42. In other words, at the intermediate point 64, the slots 62 are not bound by a wall or structure that would inhibit the flow of brazing paste along the tips 40 in the direction of the leading edges 42.

FIGS. 16-20 illustrate a shell 56 similar to that of FIGS. 12-15 but with the main portion 60 provided by a single-walled thickness, similar to that of FIGS. 7-11. As such, in the embodiment of FIGS. 16-20, brazing paste can more readily flow onto the sides of the blades 34, which may be desired in some situations.

A further aspect of this disclosure involves providing a shroud having a portion which projects beyond the trailing edges of the impeller blades, applying brazing material adjacent the portion, and flowing that brazing material along the tips of the impeller blades.

Figure 21:
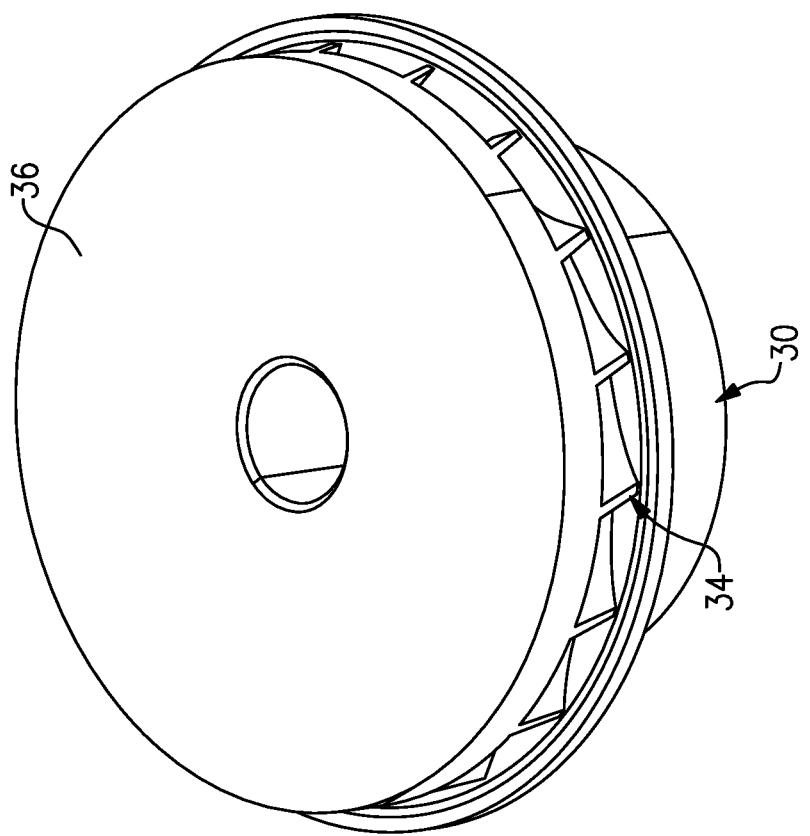
FIG. 21 is a bottom perspective view of an example impeller and shroud arrangement.
Figure 22:
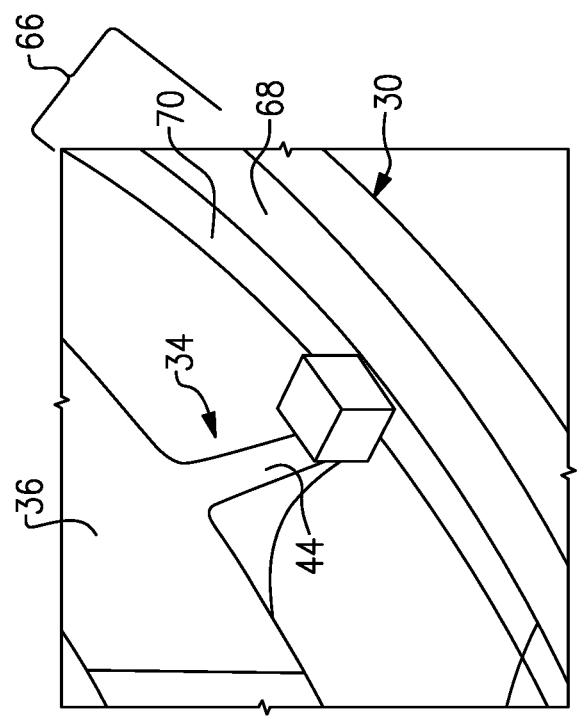
FIG. 22 is a close-up view of the arrangement of FIG. 21, and illustrates additional detail of a portion of the shroud which projects beyond trailing edges of the blades of the impeller.

With reference to FIGS. 21 and 22, an impeller 18 is turned upside down and a shroud 30 is arranged relative to the impeller 18. The shroud 30 includes a portion 66 which projects beyond, specifically radially beyond, trailing edges 44 of blades 34 of the impeller 18. The portion 66 may include an outer flange 68 and a channel 70 between the flange 68 and the trailing edges 44. The channel 70 is recessed relative to the flange 68 in the downward direction (i.e., into the page). Brazing paste 72 is provided in the channel 70 adjacent the trailing edges 44 of the blades 34. During the manufacturing process, forces such as gravity and capillary forces, will cause the brazing paste 72 to run along the tips 40 of the blades 34 from the trailing edges 44 to the leading edges 42. After a brazing process is complete, the portion 66 is removed by machining the portion 66 from the remainder of the shroud 30. After the portion 66 is removed, the shroud 30 is substantially flush with the trailing edges 44 and does not include a portion projecting beyond the trailing edges 44.

Figure 23:
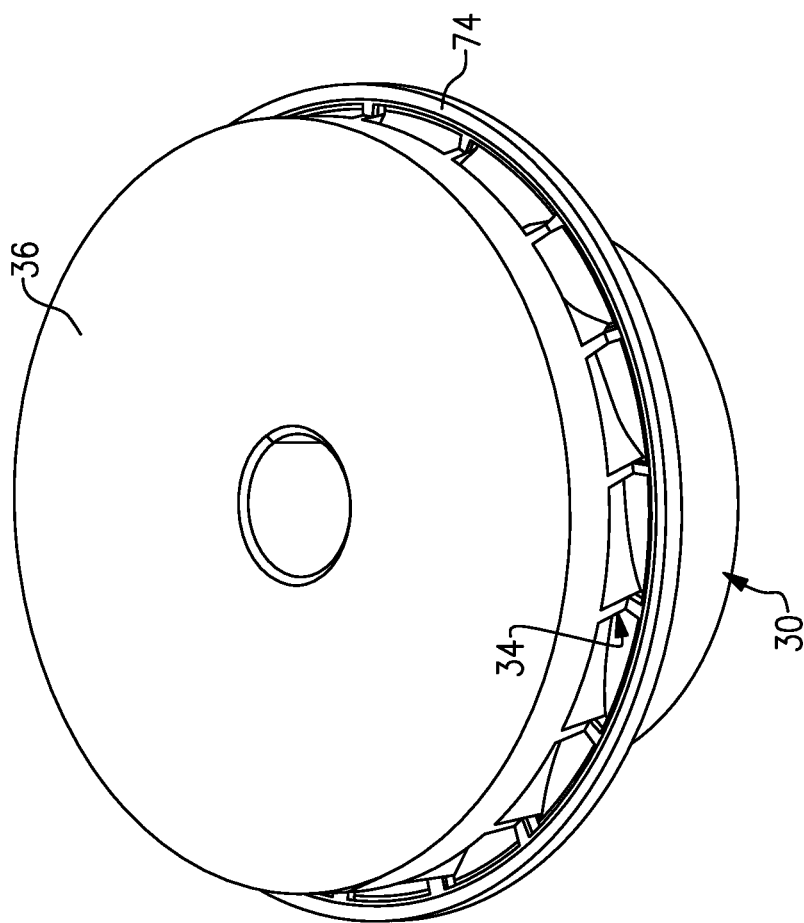
FIG. 23 is a bottom perspective view of another example impeller and shroud arrangement.
Figure 24:
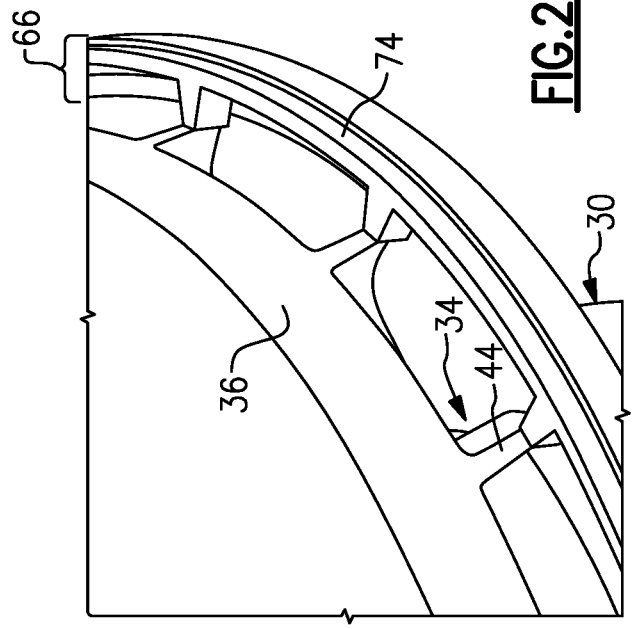
FIG. 24 is a close-up view of the arrangement of FIG. 23.

A brazing paste is not required in all examples. In FIGS. 23 and 24, the brazing material is provided by a solid preform 74 made of brazing material, namely flux and metal fillers. The preform 74 is in the form of a ring, in this example. The preform 74 is configured to sit in the channel 70. A flange 68 may not be needed in this example as the ring-shape of the preform 74 naturally holds the preform 74 in place. The preform 74 includes sections with increased dimensions, and thus provides increased brazing material, adjacent the trailing edges 44 of the blades 34. During a manufacturing process, the preform 74 is heated and the brazing material runs along the tips 40 of the blades 34 under forces of gravity and capillary forces. Following brazing, the portion 66 is removed, as in the embodiment of FIGS. 21 and 22.

It should be understood that terms such as "axial," "radial," and "circumferential" are used above with reference to the normal operational attitude of a compressor and with reference to the central axis of the compressor. Further, these terms have been used herein for purposes of explanation, and should not be considered otherwise limiting. Terms such "generally," "about," and "substantially" are not intended to be boundaryless terms, and should be interpreted consistent with the way one skilled in the art would interpret those terms.

Although the different examples have the specific components shown in the illustrations, embodiments of this disclosure are not limited to those particular combinations. It is possible to use some of the components or features from one of the examples in combination with features or components from another one of the examples. In addition, the various figures accompanying this disclosure are not necessarily to scale, and some features may be exaggerated or minimized to show certain details of a particular component or arrangement.

One of ordinary skill in this art would understand that the above-described embodiments are exemplary and non-limiting. That is, modifications of this disclosure would come within the scope of the claims. Accordingly, the following claims should be studied to determine their true scope and content.

The invention claimed is:

1. A method of manufacturing a shrouded impeller, comprising:
    arranging a shell relative to an impeller, wherein the impeller includes a plurality of blades, wherein the shell includes a plurality of slots, and wherein the arranging step includes aligning each of the slots with a tip of a respective one of the blades of the impeller;
applying brazing paste to each of the tips by using the slots to direct the brazing paste to the tips;
arranging a shroud relative to the impeller; and
joining the impeller and shroud using a brazing technique, wherein, between the steps of applying brazing paste and arranging the shroud, the method includes removing the shell from the impeller.

2. The method as recited in claim 1, wherein the shell includes a main section configured to fit radially around the tips of the blades, and wherein the shell further includes a cap covering leading edges of the blades.

3. The method as recited in claim 1, wherein the shell exhibits a single-wall thickness and the slots extend completely through the shell.

4. The method as recited in claim 1, wherein, when viewed from a radially outer location, a perimeter of each of the slots surrounds a perimeter of a corresponding one of the tips.

5. The method as recited in claim 1, wherein the step of arranging the shell includes arranged the shell radially outward of the tips.

6. The method as recited in claim 1, wherein the step of arranging the shell includes arranging the shell such that the tips project at least partially into a corresponding one of the slots.

7. The method as recited in claim 1, wherein the shell is reusable.

8. A method of manufacturing a shrouded impeller, comprising:
arranging a shell relative to an impeller, wherein the impeller includes a plurality of blades, wherein the shell includes a plurality of slots, and wherein the arranging step includes aligning each of the slots with a tip of a respective one of the blades of the impeller;
applying brazing paste to each of the tips by using the slots to direct the brazing paste to the tips;
arranging a shroud relative to the impeller; and
joining the impeller and shroud using a brazing technique, wherein the shell is removed during the brazing technique and as a consequence of the brazing technique.

9. The method as recited in claim 1, wherein the slots extend from an area adjacent trailing edges of the blades to an intermediate point along the blades.

10. The method as recited in claim 9, wherein the slots are open facing toward a leading edge of the blades.

11. The method as recited in claim 1, wherein the shell includes a portion with a thickness greater than a single-wall thickness.

12. The method as recited in claim 1, wherein the shroud includes a portion projecting beyond trailing edges of blades of the impeller.

13. The method as recited in claim 8, wherein the shell is made of wax.

14. The method as recited in claim 1, wherein the shell is made of a metallic material.

* * * * *